US008452656B2

(12) United States Patent
Nishar et al.

(10) Patent No.: US 8,452,656 B2
(45) Date of Patent: May 28, 2013

(54) PRIORITIZING AD REVIEW, BY USING EXPECTED REVENUE FOR EXAMPLE, IN AN ADVERTISING SYSTEM

(75) Inventors: Dipchand Nishar, Foster City, CA (US); Robert J. Stets, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 2232 days.

(21) Appl. No.: 11/170,727

(22) Filed: Jun. 29, 2005

(65) Prior Publication Data
US 2007/0005418 A1    Jan. 4, 2007

(51) Int. Cl.
*G06F 17/00* (2006.01)

(52) U.S. Cl.
USPC ........................................ 705/14.46

(58) Field of Classification Search
USPC ............... 705/14, 14.43, 14.48, 14.49, 14.46, 705/14.52
See application file for complete search history.

(56) References Cited

U.S. PATENT DOCUMENTS

| | | | |
|---|---|---|---|
| 6,243,375 B1 * | 6/2001 | Speicher ........................ 370/352 |
| 6,876,974 B1 | 4/2005 | Marsh et al. |
| 7,031,932 B1 * | 4/2006 | Lipsky et al. ............... 705/14.41 |
| 7,143,075 B1 * | 11/2006 | Chickering et al. ............ 706/47 |
| 7,162,451 B2 * | 1/2007 | Berger et al. .................... 705/51 |
| 7,328,164 B2 * | 2/2008 | Krikler et al. ................. 705/14.1 |
| 7,533,090 B2 * | 5/2009 | Agarwal et al. ........................ 1/1 |
| 2002/0059102 A1 | 5/2002 | Sung et al. |
| 2004/0148222 A1 | 7/2004 | Sabella et al. |
| 2004/0225562 A1 | 11/2004 | Turner |
| 2005/0021403 A1 | 1/2005 | Ozer et al. |
| 2005/0021649 A1 | 1/2005 | Goodman et al. |
| 2005/0033706 A1 | 2/2005 | Krikler et al. |
| 2005/0043345 A1 | 2/2005 | Coe et al. |
| 2006/0069613 A1 * | 3/2006 | Marquardt ...................... 705/14 |

FOREIGN PATENT DOCUMENTS

| | | |
|---|---|---|
| KR | 20030020443 | 3/2003 |
| WO | 01/39087 A2 | 5/2001 |
| WO | 2005/006282 A2 | 1/2005 |
| WO | 2005/043345 A2 | 5/2005 |

OTHER PUBLICATIONS

Form PCT/ISA/220, Notification of Transmittal of the International Search Report and the Written Opinion of the International Searching Authority, or the Declaration for PCT/US06/25716, mailed Jan. 29, 2007 (2 pgs.).

(Continued)

*Primary Examiner* — James W Myhre
*Assistant Examiner* — Michael Goldman
(74) *Attorney, Agent, or Firm* — Lerner, David, Littenberg, Krumholz & Mentlik, LLP

(57) ABSTRACT

Ads are reviewed manually once they have reached a certain expected revenue threshold (instead of attempting to review manually all incoming ads as was done in the past). This review process considers the fact that the many advertisers submit hundreds or even thousands of ads with each individually returning relatively little revenue. Such a review process should greatly reduce the number of ads, or at least to prioritize the order of ads, pending manual approval. The threshold may be set to the approximate cost of manually approving an ad, thereby reducing ad reviews pending manual review significantly. A classification of the ad (e.g., forbidden, suspicious, unchecked, an ad category, etc.), which may be determined by automated means for example, may also be used when prioritizing the order of ads pending manual approval. Revenue-based scores may also be used to control a review of an advertisement. For example, such scores may be used to select one of a plurality of review protocols.

20 Claims, 6 Drawing Sheets

OTHER PUBLICATIONS

Form PCT/ISA/210, International Search Report for PCT/US06/25716, mailed Jan. 29, 2007 (3 pgs.).

Form PCT/ISA/237, Written Opinion of the International Searching Authority for PCT/US06/25716, mailed Jan. 29, 2007 (3 pgs.).

English Translation of Japanese Office Action in Relation to Japanese Patent Application No. 2008-519637, Mailed Sep. 13, 2011 (3 pgs).

Decision of Rejection from the Japanese Patent Office Mailed Sep. 13, 2011 regarding Japanese Patent Application No. 2008-519637 (3 pgs).

Abstract by Korean Intellectual Property Office Regarding Korean Application No. 1020037001660, Dated Mar. 8, 2003 (1 pg).

* cited by examiner

PRIORITIZING AD REVIEW, BY USING EXPECTED REVENUE FOR EXAMPLE, IN AN ADVERTISING SYSTEM

§1. BACKGROUND OF THE INVENTION

§1.1 Field of the Invention

The present invention concerns advertising, such as online advertising. In particular, the present invention concerns the review, such as the manual review, of advertisements for compliance with policies, such as quality assurance policies for example.

§1.2 Background Information

Advertising systems have employed policy guidelines to which ads must adhere in order to be served. Ensuring adherence with policies often entailed manual review. Unfortunately, manually reviewing all the ads, particularly in a large online ad network, is a significant challenge. For example, the continuing increase in ad submissions has forced online ad networks to allocate large amounts of human resources to manually review ads (often to the detriment of other areas such as optimization and customer support). Even when significant manual resources are allocated to reviewing ads, the backlog of pending ad reviews may nonetheless increase as online advertising continues to become more and more popular. Such backlogs can be a source of frustration to advertisers, and can represent lost opportunity for revenue to advertising networks.

In an effort to address manual ad review backlogs, auto-review systems have been implemented which may automate a portion of ad review. (See, e.g., U.S. patent application Ser. No. 11/026,415 (hereafter referred to as the '415 application and incorporated herein by reference), titled "POLICY CHECKING FRAMEWORK FOR AUTOMATED JUDGMENT OF ADVERTISEMENTS," filed on Dec. 30, 2004, and listing Gregory Joseph Badros, Lucy Zhang and Robert J. Stets as inventors.) Despite the utility of auto-check systems, some or all of the automatically checked ads may still require manual review. Since ad submission rates are expected to continue to grow, ad review backlogs are expected to remain high. Consequently, backlogs of ads awaiting manual review are expected to be a continuing challenge.

As can be appreciated from the foregoing, it will be useful to improve the way in which ads, such as online ads for example, are reviewed.

§2. SUMMARY OF THE INVENTION

To complement automation efforts, such as those described in the '415 application for example, embodiments consistent with the present invention may be used to only review manually ads (or review ads in a certain way) once they have reached a certain expected revenue threshold (instead of attempting to review manually all incoming ads as was done in the past). This strategy is motivated, at least in part, by the fact that the many advertisers submit hundreds or even thousands of ads with each individually returning relatively little revenue. Such embodiments consistent with the present invention have the potential to greatly reduce the number of ads, or at least to prioritize the order of ads, pending manual approval.

At least some embodiments consistent with the present invention may use a threshold equal to the approximate cost of manually approving an ad, thereby reducing ad reviews pending manual review significantly.

At least some embodiments consistent with the present invention may also consider a classification of the ad (e.g., forbidden, suspicious, unchecked, etc.), which may be determined by automated means for example, to prioritize the order of ads pending manual approval.

§3. BRIEF DESCRIPTION OF THE DRAWINGS

§4. DETAILED DESCRIPTION

Figure 1:
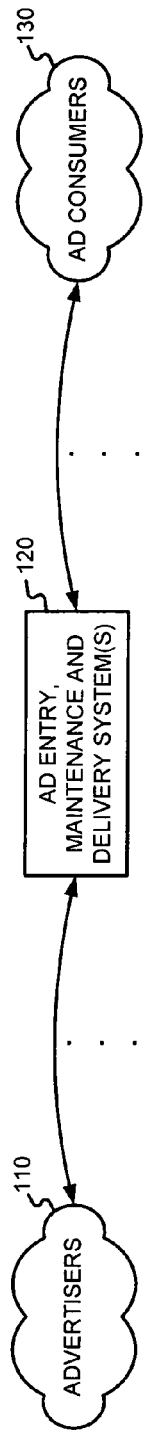
FIG. 1 is a high-level block diagram showing parties or entities that can interact with an advertising system.

The present invention may involve novel methods, apparatus, message formats, and/or data structures for prioritizing ad reviews. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

In the following, definitions of terms that may be used in describing the present invention are provided in §4.1. Then exemplary environments in which, or with which, embodiments consistent with the present invention may operate are described in §4.2. Thereafter, exemplary embodiments consistent with the present invention are described in §4.3. Finally, some conclusions regarding the present invention are set forth in §4.4.

§4.1 Definitions

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document on which, or with which the ad is to be served, includes certain topics or concepts, or falls under a particular cluster or clusters, or some other classification or classifications (e.g., "verticals"). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

An "ad fraudster" may be an advertiser that has committed fraud against an ad network in the past, or an advertiser that is suspected of committing fraud (presently or in the future) against an ad network. One example of an ad fraudster is an advertiser that has opened an account with an invalid credit card. Another example of an ad fraudster is an advertiser that has been delinquent in paying balances for the serving of one or more of its ads.

§4.2 Exemplary Advertising Environments in which, or With which, Embodiments Consistent with the Present Invention May Operate FIG. 1 is a high level diagram of an advertising environment. The environment may include an ad entry, maintenance and delivery system (simply referred to as an "ad server") 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection (e.g., a click-through) related to the ad occurred) to the system 120. This usage information may include measured or observed user behavior related to ads that have been served.

Figure 2:
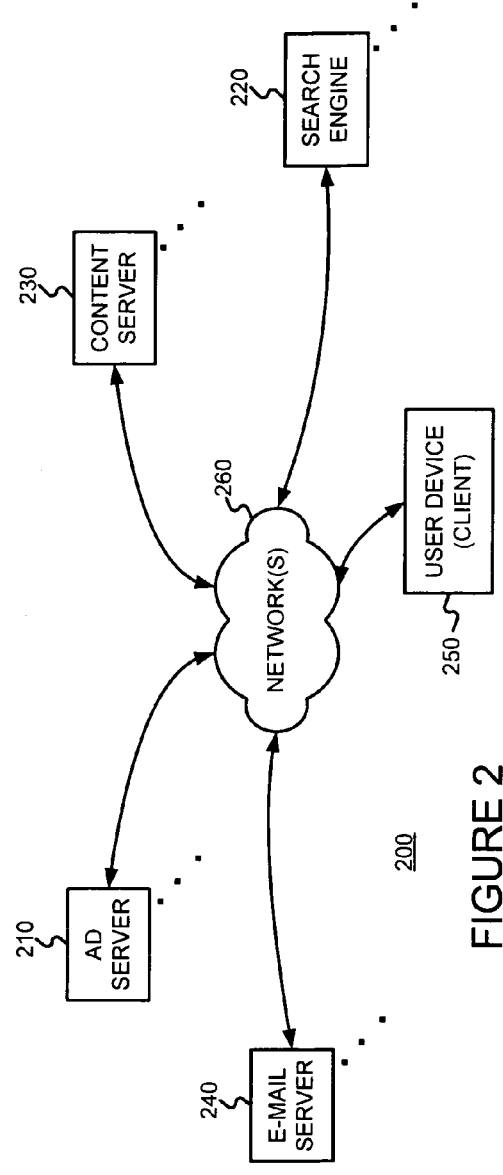
FIG. 2 is a diagram illustrating an exemplary environment in which, or with which, embodiments consistent with the present invention may operate.

The ad server 120 may be similar to the one described in FIG. 2 of U.S. patent application Ser. No. 10/375,900 (referred to as "the '900 application" and incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which embodiments consistent with the present invention may be used. A user device (also referred to as a "client" or "client device") 250 may include a browser facility (such as the Firefox browser from Mozilla, the Explorer browser from Microsoft, the Opera Web Browser from Opera Software of Norway, the Navigator browser from AOL/Time Warner, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad way determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

Figure 3:
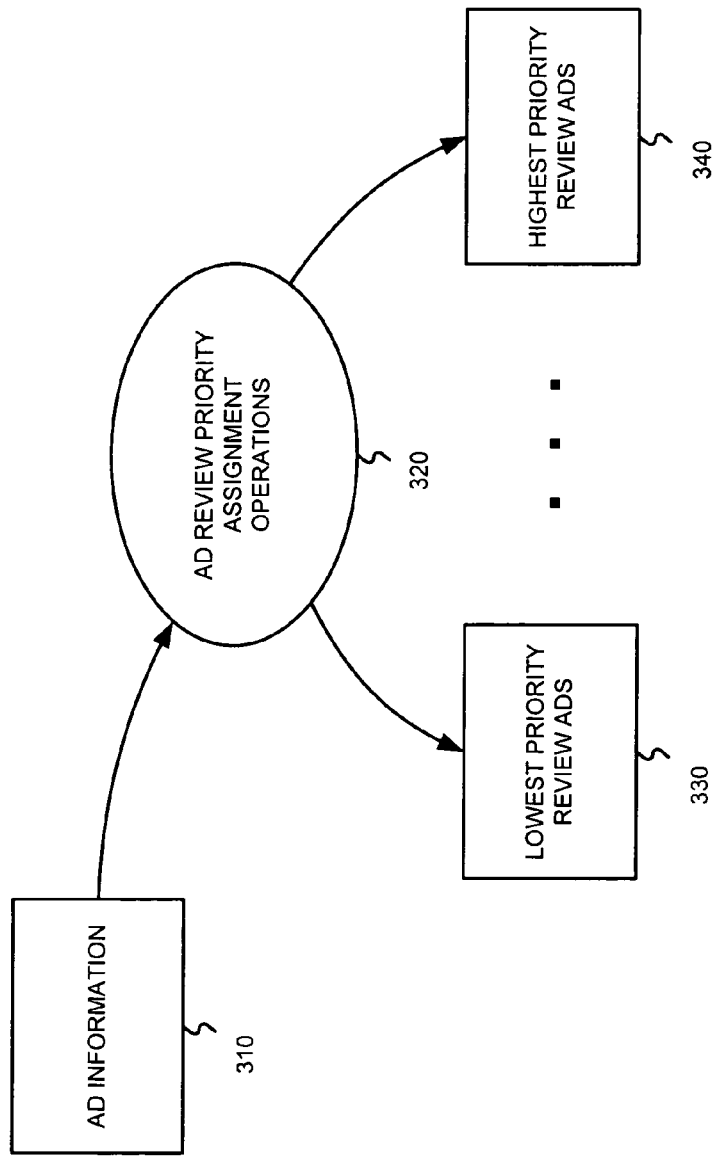
FIG. 3 is a bubble diagram of exemplary operations that may be performed in a manner consistent with the present invention, as well as information that may be used and/or generated by such operations.

FIG. 3 is a bubble diagram of exemplary operations that may be performed in a manner consistent with the present invention, as well as information that may be used and/or generated by such operations. Embodiments consistent with the present invention may review and score ads, and may use the score (perhaps in concert with other information such as an ad classification) to determine a priority for manual review. Doing so, allows the advertising system to better allocate human resources, reduce expenses, and reduce the backlog of ads waiting to be approved.

As shown in FIG. 3, embodiments consistent with the present invention may include ad review priority assignment operations 320. The ad review priority assignment operations 320 may obtain and process ad information 310 to prioritize ads. The ads may be assigned one of at least two priorities—the lowest priority 330 and the highest priority 340. In the simplest case, the highest priority ads 340 are those that are eligible for manual review 340 (e.g., those that are worth the human resources and expenses associated with a manual review), and the lowest priority ads 330 are those that are not eligible for manual review (but that might be eligible for automatic reviews only).

Although not shown, various intermediate priority levels may be provided, and the invention is not limited to two (2) priority levels. Indeed, although not shown, ads may simply be provided with a priority score and ordered for manual review accordingly. Thus, priority may be expressed as a discreet value or classification, or a continuous score, or some combination of the two.

The ad review priority assignment operations 320 assign review priority values to ads using, for example, ad classification(s), score value(s), and/or threshold(s). These operations 320 may determine a set 340 of ads that are eligible for manual review and a set 330 of ads that are not eligible for manual review.

§4.3.1 Exemplary Methods

Figure 4:
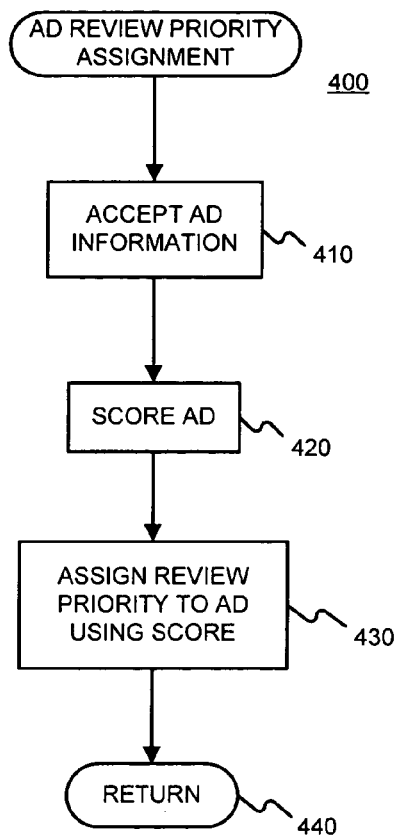
FIG. 4 is a flow diagram of an exemplary method for prioritizing ad reviews in a manner consistent with the present invention.

FIG. 4 is a flow diagram of an exemplary method 400 for prioritizing ad reviews in a manner consistent with the present invention. Specifically, the method 400 may accept ad information. (Block 410) Once the ad information is obtained, the method 400 may score the ads (e.g., based on expected revenue). (Block 420) Subsequently, the method 400 may assign a review priority to the ad. (Block 430) Collectively, review priorities of individual ads may effectively prioritize the review of a set of ads.

Referring back to block 420, the score value may simply be the revenue expected to be produced by the ad. The expected revenue may be the sum of expected future revenue events, perhaps discounted to a present value of money.

Referring back to block 430, the method 400 may assign priority values to an ad based on the ad's classification(s), the ad's score(s), and/or revenue threshold(s). As discussed above, the priority value may be a continuous value, such as the score determined in block 420. Alternatively, the priority value may be a discrete value, such as one of a discrete number of priority groups. For example, in one embodiment consistent with the present invention, the determined score may be an expected revenue, and the priority assignment may include an act of comparing the score with a revenue threshold (which may be set equal to the approximate cost of approving an ad manually). In such an embodiment (perhaps depending on the ad classification), if the score value of an ad exceeds the revenue threshold, the ad may be considered eligible for manual review (e.g., prioritized as "eligible"). Otherwise, the ad should not be considered eligible for manual review (e.g., prioritized as "ineligible" or simply removed from consideration).

As will be appreciated by those skilled in the art, the particular acts performed by methods consistent with the present invention, such as method 400 for example, may depend on the context in which it is used. For example, in a first exemplary ad serving environment, it is possible that ads are not served until they have been manually reviewed. They may be served only if they pass the manual review. Otherwise, they are not served. Such an exemplary environment may be referred to as a "manually review before serve" ad serving environment. In a second exemplary ad serving environment, it is possible that ads are served before they are manually reviewed, but can be removed from the ad serving system if they fail manual review. Such an exemplary environment may be referred to as a "serve then manually review" ad serving environment. In a third exemplary ad serving environment, it is possible that ads are served in a limited manner (e.g., only on limited properties or Websites (e.g., Google.com only, and not AdSense publishers, not on partner Websites, etc.), only to certain users (e.g., adults only, non-family safe), etc.) before they are manually reviewed. After manual review, an ad can be served in a more expansive manner if they pass manual review, or continue to be served in a more limited manner (or not served at all) if they fail manual review. Such an exemplary environment may be referred to as a "limited serve then manually review" ad serving environment.

Referring back to block 430, in a "limited serve then manually review" ad serving environment, in an exemplary embodiment consistent with the present invention, the priority values that may be assigned are: DEFAULT (a priority has not been assigned), LOW (the ad will be withheld from manual review), NORMAL (the ad is eligible for human review), and HIGH (the ad is eligible for human review and the ad contains at least one "suspicious" or "forbidden" creative or keywords (e.g., as determined by an autocheck means, such as those described in the '415 application). In such an embodiment, the method 400 may only exempt an ad from human review when a priority value of LOW is given to the ad.

Figure 5:
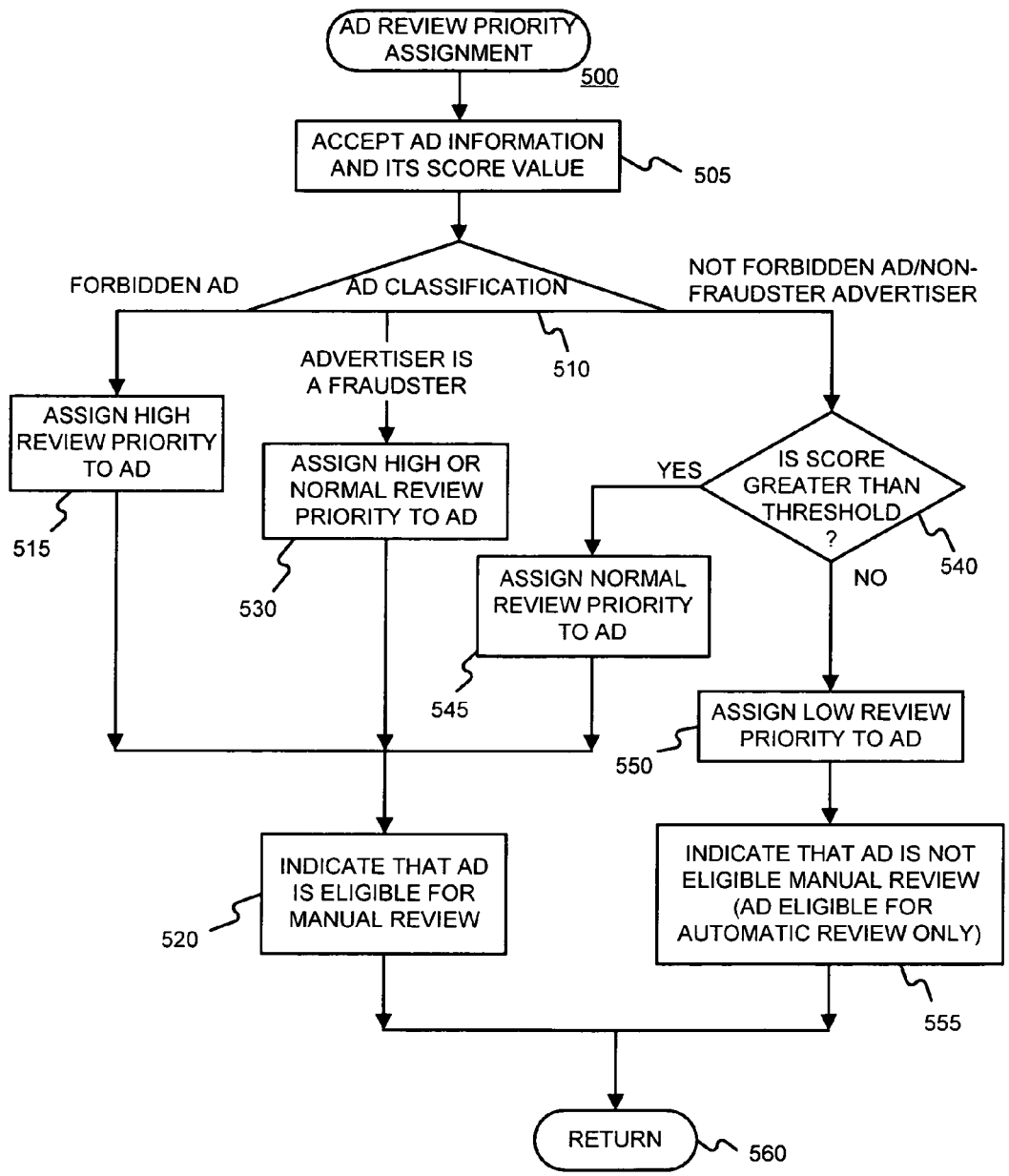
FIG. 5 is a flow diagram of an exemplary method for performing priority assignment operations in a manner consistent with the present invention.

FIG. 5 is a flow diagram of an exemplary method 500 for assigning ad review priorities in a manner consistent with the present invention. Such a method 500 is particularly useful in a "limited serve then manually review" ad serving environment. In particular, the method 500 may accept ad information along with its ad score value. (Block 505) Once the ad information and its score value are obtained, different branches of the method 500 may be performed depending on different ad classifications. (Block 510) If an ad has been classified as "forbidden", the method 500 may simply assign a HIGH review priority to the ad. (Block 515) As a result, the method 500 may indicate that the ad is eligible for manual review (Block 520) before the method 500 is left (Node 560). If an ad has been classified as belonging to an "advertiser fraudster" (but is not classified a "forbidden" ad), the method 500 may assign a HIGH (or NORMAL) review priority to the ad. (Block 530) The method 500 may then indicate that the ad is eligible for manual review (Block 520) before it 500 is left. (Node 560) If an ad has been classified as "not forbidden/non-fraudster advertiser" (meaning no detected violations or potential problems so far), the method 500 may determine whether the score (e.g., an expected revenue) of the ad is greater that a threshold (e.g., a cost threshold). (Block 540) If the score value is greater than the threshold, the method 500 may assign a NORMAL review priority to the ad. (Block 545) The method 500 may then indicate that the ad is eligible for manual review (Block 520) before it is left (Node 560). Conversely, if the score value is not greater than the threshold, the method 500 may assign a LOW review priority to the ad (Block 550) and indicate that the ad is not eligible for manual review (Block 555) (though it may nonetheless be eligible for automatic review). The method 500 may then be left. (Node 560)

Referring back to block 510, the advertising system may have means for examining ads when submitted by advertisers for potential violations. Thus, as mentioned earlier, an ad may be classified as "forbidden", "advertiser fraudster", or "not forbidden/non-fraudster advertiser" (meaning no detected violations so far). When assigning priority values, the method 500 considers the ad classification. Specifically, an ad that is classified as "forbidden" may indicate that the advertising system has detected sensitive or offensive words within the ad creative or keywords. An ad classified as "advertiser fraudster" simply indicates that the advertising system has detected that the advertiser is (or has been, or is likely to be) involved in fraudulent activities. An ad classified as "not forbidden/non-fraudster advertiser" indicates that the advertising system has not detected any violation so far.

Referring back to blocks 515 and 520, upon receiving an ad classified as "forbidden", the method 500 need not examine the ad's score value against the revenue threshold. Since the ad contains forbidden or suspicious keywords or creatives, the method 500 may assign a HIGH review priority value to the "forbidden" ad indicating that it is eligible for a manual review. The rationale is that if the ad is being served on a limited basis, but might violate certain policies, the ad serving system would likely want to decide whether or not to remove the ad as quickly as possible.

Referring back to blocks 530 and 520, upon receiving an ad classified as "advertiser fraudster", again the method 500 need not examine the ad's score value against the revenue threshold. Since the ad's advertiser is (or has been, or is likely to be) involved in fraudulent activities, the method 500 may assign a HIGH or NORMAL review priority value to the "advertiser fraudster" ad indicating that it is eligible for a manual review. The rationale is that if the ad is being served on a limited basis, but might the ad serving system might not be compensated by the advertiser, the ad serving system would likely want to decide whether or not to remove the ad. It may be the case that the ad serving system is willing to tolerate ad fraudsters more than forbidden ads. This is because while the former may cause a drop in revenue, the later can damage the good reputation of the ad serving system.

Referring back to block 540, upon receiving an ad classified as "not forbidden/non-fraudster advertiser", the method 500 may examine the score to determine if the score value is greater than the revenue threshold. The revenue threshold may be set to the approximate cost to manually approve an ad. Furthermore, the present invention may allow for different revenue thresholds to accommodate billing differences in different countries. This flexibility may help the prioritization accommodate worldwide differences in revenue relations and manual review resources. If the score value is found to be greater than the threshold, then the method 500 may assign a NORMAL review priority to the ad, thereby indicating that the ad is eligible for a manual review. Conversely, if the score value is found not to exceed the threshold, the method 500 may assign a LOW review priority to the ad indicating that the ad is not eligible for a manual review.

Using such a scheme as that of method 500, it is clear that ad reviews may be prioritized using the ad(s) classification, the ad(s) score, and/or a threshold. Using a revenue threshold may reduce the amount of ads pending a manual review, thereby reducing expenditures associated with manual reviews and allowing for better allocation of human resources.

Figure 6:
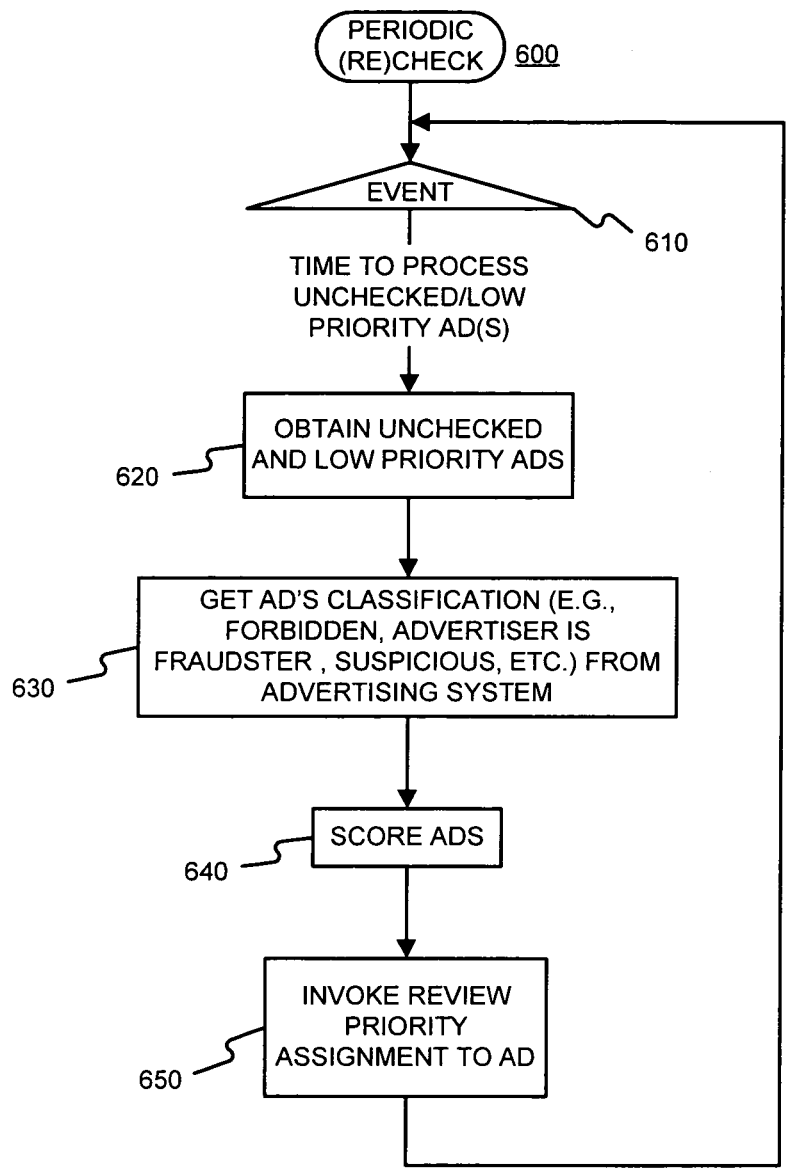
FIG. 6 is a flow diagram of an exemplary method for performing ad check operations in a manner consistent with the present invention.

FIG. 6 is a flow diagram of an exemplary method 600 for performing periodic check operations in a manner consistent with the present invention. The method 600 may periodically poll unchecked and/or LOW priority ads to determine if the ads should be promoted to a higher priority. Particularly, when it is time to process unchecked and/or LOW priority ads, the method 600 may obtain such an unchecked or a LOW priority ad. (Blocks 610 and 620) The method 600 may also obtain the ad's classification (e.g., forbidden, advertiser is fraudster, etc) from the advertising system. (Block 630) Subsequently, the method 600 may score the ad and invoke ad review priority assignment operations. (Blocks 640 and 650) (Recall FIG. 5.)

Referring back to block 620, the method 600 may periodically reexamine LOW priority ads or any unchecked ads to see if their status has changed. For instance, if an ad's score is re-determined to be higher (e.g., ad uses an obscure term for targeting (e.g., an obscure name) that suddenly becomes popular (e.g., a popular search query term), the advertiser increases an offer, the advertiser increases its budget, etc.), and/or if the threshold is lowered (e.g., due to a lower cost of manual review, a smaller backlog, etc.), the score might possibly exceed the threshold. The method 600 may detect this change and seek to update the ad's priority value. Another change for a LOW priority ad justifying a higher priority level assignment may be a change in the ad's classification (e.g., the ad's landing page has profane or hate content that it didn't have before).

Referring back to block 650, once the method 600 has obtained a LOW priority or unchecked ad along with its classification and score from the advertising system, it may proceed to invoke ad review priority assignment operations for the ad. For example, the method 600 may invoke the method 500 to determine the ad's updated priority assignment in case any changes have occurred to the ad since the last time it was examined, or in case the ad hasn't been checked at all.

§4.3.2 Exemplary Apparatus

Figure 7:
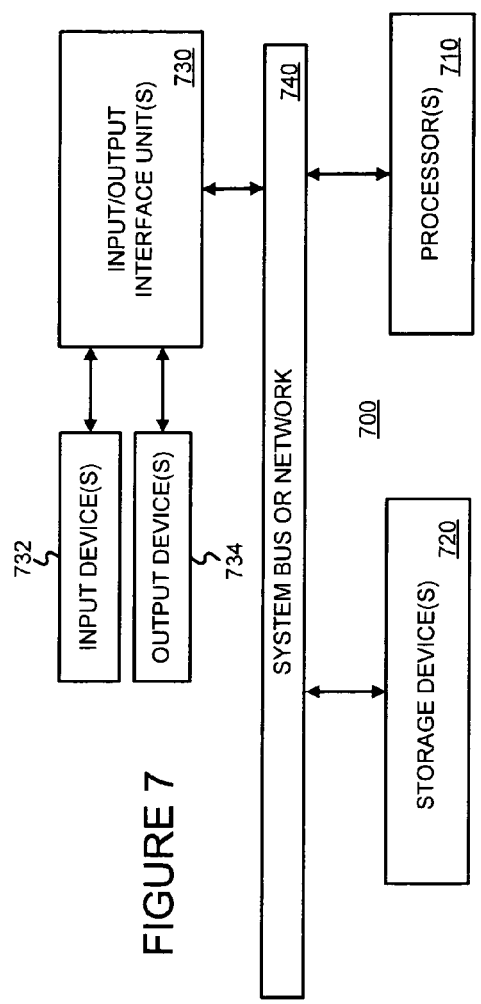
FIG. 7 is a block diagram of an exemplary apparatus that may perform various operations and store information in a manner consistent with the present invention.

FIG. 7 is high-level block diagram of a machine 700 that may perform one or more of the operations discussed above. The machine 700 basically includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

§4.3.3 Refinements, Alternatives and Extensions

At least some of the embodiments described above discussed that an ad score may be a function of expected revenue. In at least some embodiments consistent with the present invention, the expected value may be future review streams discounted to the present time, to a time of an expected manual review, or to some other time.

Policy violations that may be automatically checked and perhaps used to classify ads (prior to the manual review prioritization) may include one or more of: (A) prohibition of superlatives, (B) prohibition of repeated words, (C) prohibition of repeated phrases, (D) prohibition of trademarks, (E) prohibition of vulgar language, (F) prohibition of ad landing pages that generate pop-up ads, (G) prohibition of ad landing pages that disable a browser "back" function, (H) inappropriate capitalization, (I) prohibition of landing pages that cannot be viewed in a standard browser, (J) prohibition of multiple exclamation points, (K) prohibition of text that is too long, (L) landing page URL that does not match the visible URL spelling, (M) prohibition of counterfeit design goods, etc.

Although some of the foregoing embodiments described LOW priority ads as ads being ineligible for manual review, such ads may be later reviewed manually if the backlog of ads awaiting manual review is reduced or eliminated. Thus, for example, in at least some embodiments consistent with the present invention, if there are no HIGH or NORMAL priority ads awaiting manual review, the LOW priority ads may be reviewed.

Although some of the priority assignment methods described above, such as the method 500 of FIG. 5 for example, are particularly useful in the context of a "limited serve then manually review" ad serving environment, those skilled in the art will recognize that the priority may be assigned in other ways, and will often be driven by the ad serving environment used. For example, in a "manually review before serve" ad serving environment, forbidden ads and ads associated with an advertiser fraudster might be given a LOW priority, particularly if their score is low.

Although some of the priority assignment methods described above did not consider the ad's score for ads having certain classifications (Recall, e.g., the treatment of forbidden ads and advertiser fraudster ads in the method 500 of FIG. 5.), the ad's score may be used in concert with its classification. For example, a score may be used to order ads, or further prioritized ads, given a HIGH priority. As can be appreciated, embodiments consistent with the present invention may be used to prioritize ads by (a) assigning ads to one of a plurality of priority groups, (b) sorting ads, (c) assigning ads to one of a plurality of priority groups and then further sorting them within the groups, (d) assigning ads to one or a plurality of priority groups and subgroups, etc. Ad classifications (e.g., assigned by an auto-check means such as described in the '415 application) and/or ad scores (e.g., expected revenue) may be used to perform such sorting and/or to make such assignments.

Although many of the foregoing embodiments described using a revenue-based score to prioritize a manual review of ads, at least some embodiments consistent with the present invention may use a revenue-based score to determine whether to review ads using a first review protocol or a second review protocol, or more generally to determine a review protocol to be used. Different review protocols could include, for example, various manual and/or automated reviews, multi-tiered reviews, single-tiered reviews, etc.

Although some of the foregoing embodiments used revenue-based scores with respect to ads, at least some embodiments consistent with the present invention may use revenue-based scores with respect to sets of ads, such as categories of ads for example. For example, if ads in an automobile category tend to have lower disapproval rates and much higher revenue generation than ads in some other category, they may be prioritized differently (or different revenue-based thresholds may be used).

§4.4 Conclusions

As can be appreciated from the foregoing, by establishing a threshold (e.g., a revenue threshold) and requiring an ad score (e.g., revenue returns from ad) to exceed the threshold before it's eligible for manual review, embodiments consistent with the present invention may be used to reduce the number of manual reviews. Embodiments consistent with the present invention may score the ads based on the revenue they are expected to generate and use the revenue threshold, perhaps in concert with an ad classification, to prioritize ad review.

What is claimed is:

1. A computer-implemented method for controlling a review of advertisements, the method comprising:
   a) accepting, with a computer system including at least one computer on a network, information about an advertisement;
   b) determining, with the computer system, a revenue generation value using the accepted information;
   c) determining, with the computer system, a score for the advertisement using the determined revenue generation value; and
   d) controlling, with the computer system, a review of the advertisement using at least the determined score, wherein controlling a review of the advertisement includes prioritizing a manual review of the advertisement.

2. The computer-implemented method of claim 1 wherein the accepted information about an advertisement includes targeting information and offer information associated with the targeting information, and
   wherein determining a revenue generation value uses the accepted targeting information and the offer information to determine expected revenue.

3. The computer-implemented method of claim 2 wherein the expected revenue includes a plurality of future revenue events.

4. The computer-implemented method of claim 3 wherein determining a revenue generation value discounts the plurality of future revenue events to reflect the time value of money.

5. The computer-implemented method of claim 4 wherein the plurality of future revenue events are discounted to a present time.

6. The computer-implemented method of claim 4 wherein controlling a review includes prioritizing a manual review of the advertisement, and
   wherein the plurality of future revenue events are discounted to a time for manual review of the ad.

7. The computer-implemented method of claim 1 wherein the advertisement information includes an advertisement classification, and
   wherein controlling a review of the advertisement using at least the determined score further uses the advertisement classification.

8. The computer-implemented method of claim 7 wherein the advertisement classification is selected from a group consisting of (A) advertisement with policy violations, (B) advertisement associated with a fraudulent advertiser, and (C) advertisement with no policy violations.

9. The computer-implemented method of claim 7 wherein the advertisement classification is a category of the ad.

10. The computer-implemented method of claim 1 wherein controlling a review of the advertisement using at least the determined score includes i) comparing the score to a threshold, end
ii) controlling the review of the advertisement based on a result of the comparison.

11. The computer-implemented method of claim 10 wherein controlling a review of the advertisement includes prioritizing a manual review of the advertisement, and
wherein the threshold is based on an expected cost of manually reviewing the advertisement.

12. The computer-implemented method of claim 10 wherein controlling a review of the advertisement includes prioritizing a manual review of the advertisement,
wherein the score is based on an expected revenue from the advertisement, and
wherein the threshold is based on an expected cost of manually reviewing the advertisement.

13. The computer-implemented method of claim 12 wherein, if the expected score of the advertisement is less than the threshold, then the advertisement is made ineligible for manual review.

14. The computer-implemented method of claim 12 wherein, if both (A) the expected score of the advertisement is less than the threshold, and (B) the ad does not violate any policies and is not associated with a fraudulent advertiser, then the advertisement is made ineligible for manual review.

15. Apparatus for controlling a review of advertisements, the apparatus comprising:
a) at least one processor; and
b) at least one storage device storing processor-executable instructions which, when executed by the at least one processor, perform a method including
1) accepting information about an advertisement,
2) determining a revenue generation value using the accepted information,
3) determining a score for the advertisement using the determined revenue generation value, and
4) controlling a review of the advertisement using at least the determined score, wherein controlling a review of the advertisement includes prioritizing a manual review of the advertisement.

16. The apparatus of claim 15 wherein the accepted information about an advertisement includes targeting information and offer information associated with the targeting information, and
wherein determining a revenue generation value uses the accepted targeting information and the offer information to determine expected revenue.

17. The apparatus of claim 15 wherein the advertisement information includes an ed classification, and
wherein controlling a review of the advertisement using at least the determined score further uses the advertisement classification.

18. The apparatus of claim 17 wherein the advertisement classification is selected from a group consisting of (A) advertisement with policy violations, (B) advertisement associated with a fraudulent advertiser, and (C) advertisement with no policy violations.

19. The apparatus of claim 15 wherein controlling a review of the advertisement using at least the determined score includes
i) comparing the score to a threshold, and
ii) controlling the review of the advertisement based on a result of the comparison.

20. The apparatus of claim 19 wherein controlling a review of the advertisement includes prioritizing a manual review of the advertisement, and
wherein the threshold is based on an expected cost of manually reviewing the advertisement.

* * * * *